United States Patent
Tanaka et al.

[19]

[11] Patent Number: 5,963,419
[45] Date of Patent: Oct. 5, 1999

[54] ELECTRIC DOUBLE-LAYER CAPACITOR HAVING A SEPARATOR MADE FROM A CELLULOSE FIBER

[75] Inventors: Yuichiro Tanaka; Noriko Ishii; Jiro Okuma; Ritsuo Hara, all of Saitama, Japan

[73] Assignee: Honda Giken Kogyo Kabushiki Kaisha, Tokyo, Japan

[21] Appl. No.: 08/955,306

[22] Filed: Oct. 21, 1997

[30] Foreign Application Priority Data

Oct. 21, 1996 [JP] Japan ................................. 8-297765

[51] Int. Cl.⁶ ............................... H01G 9/02; H01G 2/10
[52] U.S. Cl. ......................... 361/512; 361/517; 361/535
[58] Field of Search ................................. 361/502–505, 361/511, 512, 514, 517–519, 523, 526, 530, 535–537

[56] References Cited

U.S. PATENT DOCUMENTS

| | | | |
|---|---|---|---|
| 4,099,218 | 7/1978 | Klein et al. | 361/512 |
| 4,327,400 | 4/1982 | Muranaka et al. | 361/502 |
| 4,480,290 | 10/1984 | Constanti et al. | 361/512 |
| 4,511,949 | 4/1985 | Shedigian | 361/319 |
| 4,876,451 | 10/1989 | Ikeda et al. | 361/540 |
| 5,158,647 | 10/1992 | Hurley | 162/138 |
| 5,393,619 | 2/1995 | Mayer et al. | 429/152 |
| 5,402,306 | 3/1995 | Mayer et al. | 361/502 |
| 5,555,155 | 9/1996 | Patel et al. | 361/503 |
| 5,568,353 | 10/1996 | Bai et al. | 361/523 |

FOREIGN PATENT DOCUMENTS

| | | |
|---|---|---|
| 63-187614 | 8/1988 | Japan . |
| 6-168848 | 6/1994 | Japan . |
| 6-233691 | 8/1994 | Japan . |
| 9-129509 | 5/1997 | Japan . |

*Primary Examiner*—Kristine Kincaid
*Assistant Examiner*—Anthony Dinkins

[57] ABSTRACT

An electric double-layer capacitor includes a casing, a pair of porous electrodes disposed within the casing, a permeable separator sandwiched between both the porous electrodes, and an electrolytic liquid formed of an organic solvent, injected into the casing and permeating the porous electrodes and the separator. The separator is formed from an aggregate of cellulose fiber having a surface modified by an organic solvent thereby.

13 Claims, 2 Drawing Sheets

10 μm

ELECTRIC DOUBLE-LAYER CAPACITOR HAVING A SEPARATOR MADE FROM A CELLULOSE FIBER

BACKGROUND OF THE INVENTION

1. Field of the Invention

The present invention relates to an electric double-layer capacitor. The present invention also relates to a separator for an electric double-layer capacitor and a method of making such a separator.

2. Description of the Related Art

Double-layer electrochemical capacitors are energy storage devices. Charge storage in double-layer electrochemical capacitors is a surface phenomenon that occurs at the interface between electrode and electrolyte. Because such double-layer capacitors have an extremely large capacitance on the order of several Farads or more, there has been considerable interest in improving their other properties to make a commercially viable energy storage device.

Double-layer capacitors typically utilize a pair of electrodes having a separator interposed therebetween. The separator absorbs and retains the electrolyte thereby maintaining close contact between the electrolyte and the electrodes.

The most common type of separator material for such capacitors is paper. Conventional paper separators have particle impurities and void defects that may lead to poor DC leakage characteristics or failure of the capacitor. Conventional paper separators also have poor mechanical properties and are prone to tearing during manufacture of the capacitor.

Polymers are common alternatives to paper separators. Polymer separators, however, generally have an unacceptably high electrical resistance. The separator is typically the largest contributor to the capacitors internal series resistance between the anode and cathode. Therefore, there is a need for a separator having low series resistance.

There is, a conventional electric double-layer capacitor including a separator made of a non-woven fabric formed from a polypropylene fiber that is sandwiched between a pair of porous electrodes formed essentially of activated carbon. In this conventional double-layer capacitor, the electrodes and the separator are impregnated with an electrolytic liquid comprised of an organic solvent (see Japanese Patent Application Laid-open No.63-187614, hereby incorporated by reference).

The reason why the organic solvent is used for the electrolytic liquid is that when the electric double-layer capacitor is used under a high voltage, electrolysis occurs especially when an aqueous electrolytic liquid such as sulfuric acid is used.

Another desirable property of separators is inhibiting self-discharge of the electric double-layer capacitor. More specifically, separators should obstruct the electrophoretic migration of charged carbon particles released from one of the electrodes toward the other electrode to reduce the electric neutralization. Furthermore, separators should be permeable to the electrolytic liquid to permit the migration of charged ions and have heat and chemical resistances.

However, known separators suffer from various problems and are susceptible to heat and chemicals especially when formed with polypropylene fibers.

Therefore, the present inventors have developed an electric double-layer capacitor including a separator which is formed from an ultra thin cellulose fiber, e.g., a bacterial cellulose aggregate (see Japanese Patent Application Laid-open No.9-129509, hereby incorporated by reference). This separator has heat and chemical resistances because it is formed from the cellulose fiber.

SUMMARY OF THE INVENTION

The present inventors have made further investigations concerning the electric double-layer capacitor. As a result, the inventors have found that the permeation of the electrolytic liquid into the separator is lower when an organic solvent is used as the electrolytic liquid as compared with other aqueous electrolytic liquids. This is because the organic solvent is hydrophobic, as compared with the aqueous electrolytic liquid, e.g., sulfuric acid, while a large number of OH groups on the surface of the cellulose fibers are hydrophilic.

Moreover, the degree of permeation of the electrolytic liquid into the separator is an important factor governing the resistance value of the separator because the electrolytic liquid is a medium for charged ions. Therefore, there is a need for increasing the permeation of the organic solvent into the separator when utilizing an organic solvent as the electrolytic liquid.

Accordingly, it is an object of the present invention to provide an electric double-layer capacitor, having an increased permeation of an organic solvent electrolyte into the separator as compared with the conventional art.

Another object of the present invention is to reduce the internal resistance of electric double-layer capacitors utilizing an organic solvent as the electrolyte.

Still another object of the invention is to improve the manufacturing methods for constructing a separator for use in a double-layer capacitor.

These objects are achieved by forming the separator with cellulose fibers having a modified surface.

These objects are further achieved by modifying the surface of a separator with an organic solvent.

To still further achieve the above objects, according to a first aspect and feature of the present invention, there is provided an electric double-layer capacitor including a casing, a pair of porous electrodes disposed within the casing, a permeable separator sandwiched between both the porous electrodes, and an electrolytic liquid which is formed of an organic solvent and which is provided in the casing and which permeates the porous electrodes and the separator, the separator being formed from an aggregate of cellulose fibers having a surface modified by an organic solvent.

With the above construction, the wettability of the cellulose fiber in the electrolytic liquid is improved, leading to excellent permeation of the electrolytic liquid into the separator, whereby a reduction in internal resistance of the electric double-layer capacitor is achieved. In addition, the separator is microporous and obstructs the electrophoretic migration of charged carbon particles as described above. Hence, the self-discharging of the electric double-layer capacitor is considerably inhibited. This is remarkable in a separator formed from bacterial cellulose.

The objects of the invention are even further achieved by providing a method of making a separator for an electric double-layer capacitor, including the steps of producing a cellulose fiber aggregate, forming a sheet of the cellulose fiber aggregate, modifying a surface of the cellulose fiber aggregate sheet by immersing the sheet in an organic solvent for a predetermined time period, drying the modified sheet, and cutting the dried sheets to form the separator of a desired size and shape.

The objects are still further achieved by pre-treating the cellulose fiber aggregate sheet by immersing the sheet in an amphipathic solvent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
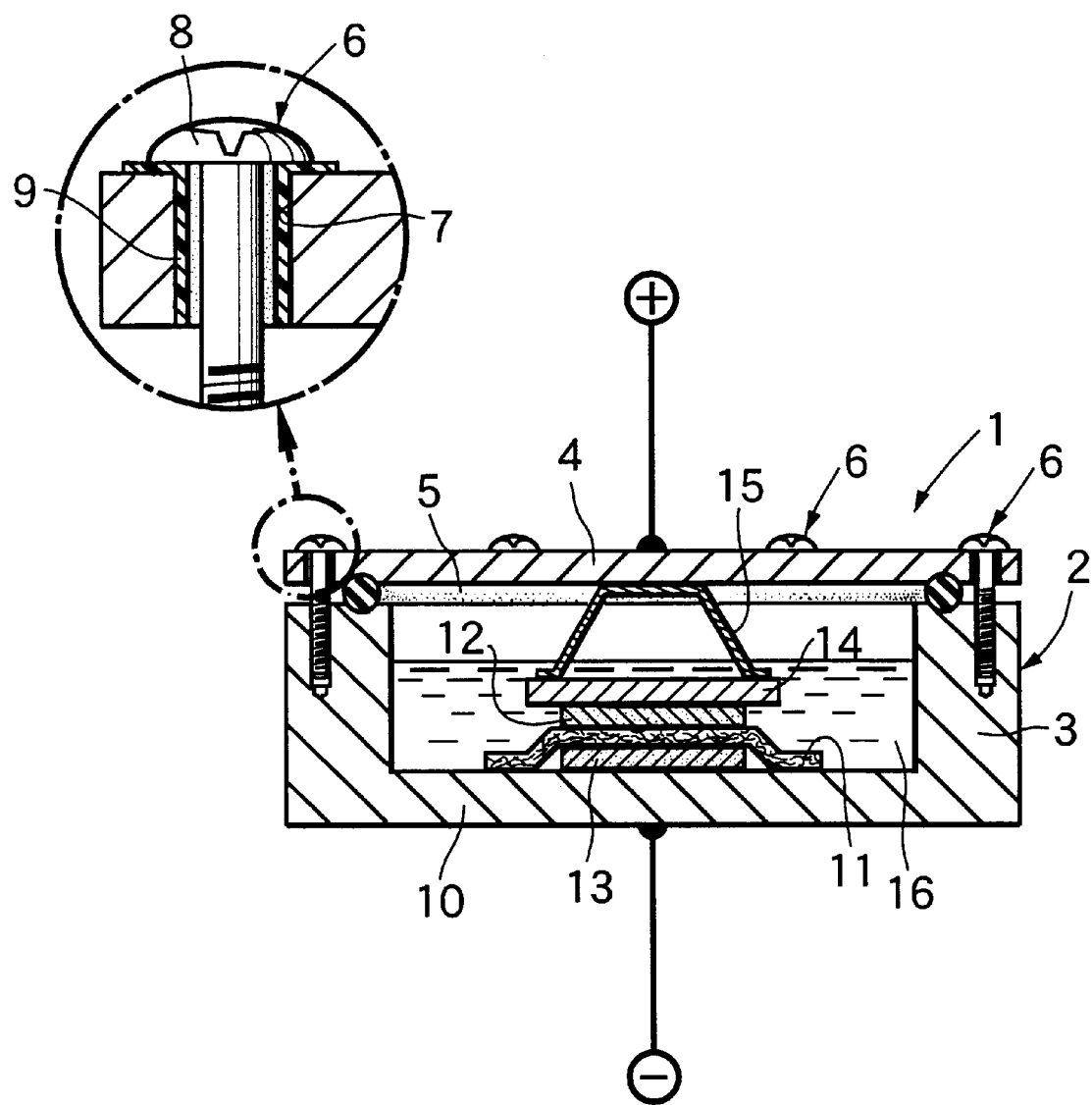
FIG. 1 is an enlarged vertical sectional front view of an essential portion of an electric double-layer capacitor according to an embodiment of the invention.

In an electric double-layer capacitor 1 shown in FIG. 1, a metal casing 2 is formed of aluminum and includes a short cylindrical body 3 having a bottom and a lid plate 4 which closes an opening in the body 3. An elastic seal ring 5 made of e.g. rubber, a synthetic resin or the like is disposed between an end face of the opening in the body 3 and the lid plate 4, thereby sealing the opening in the body 3 and electrically insulating the body 3 and the lid plate 4 from each other.

The lid plate 4 is attached to the body 3 with a plurality of screws 6. An electrically insulating skin film 9 made of e.g. a synthetic resin is formed on an inner peripheral surface of each of screw-penetrating bores 7 in the lid plate 4 and an open peripheral edge of each of the screw-penetrating bores 7 which is to be in contact with a screw head 8.

Placed in the body 3 are a pair of disk-shaped porous electrodes 12 and 13 made essentially of activated carbon, and a quadrilateral separator 11 sandwiched between both the electrodes 12 and 13. A disk-shaped current collector 14 made of e.g. aluminum is superposed on the electrode 12 on the side of the lid plate 4.

The lamination of the electrodes 12 and 13 and the separator 11 is maintained by a conductive spring member 15 mounted between the current collector 14 and the lid plate 4.

An electrolytic liquid 16 preferably formed with an organic solvent is injected into the body 3 and impregnated into both the electrodes 12 and 13 and the separator 11.

The separator 11 has an outer peripheral surface which is formed so that it is in close contact with an inner surface of a bottom wall 10 of the body 3, to prevent electrophoretic migration of charged carbon particles released from one of the electrodes 12 or 13 to the other electrode 13 or 12.

In the casing 2, the lid plate 4 is connected to an anode of a power source, and the body 3 is connected to a cathode of the power source (or to a ground such as the earth). Therefore, the electrode 12 on the side of the lid plate 4 is an anode, while the electrode 13 on the side of the bottom wall 10 of the body 3 is a cathode.

The separator 11 is formed of a cellulose fiber aggregate having a surface modified by an organic solvent.

If the electric double-layer capacitor is formed in the above manner, the wettability of the cellulose fiber to the organic solvent electrolytic liquid 16 is improved and hence, the permeation of the electrolytic liquid 16 into the separator 11 is improved, whereby a reduction in internal resistance of the electric double-layer capacitor 1 is achieved.

A bacterial cellulose comprised of extremely thin microfibrils (e.g., having a diameter of 0.1 $\mu$m or less) is most suitable as the cellulose fiber. The bacterial cellulose is produced as a gelled thick film on a surface of a culture medium by a bacterium of a strain that metabolizes ethanol to acetic acid (commonly known as an acetic acid bacterium). A preferred bacterium is at least one of bacterium strains each belonging to a genus related to the following group: Acetobacter, Rhizobium, Agrobacterium, Pseudomonas, Alcaligenes, Sarcina, Achromobacter, Aerobacter, and Azotobacter and variant strains induced from the bacterium strains.

The bacterial cellulose has the following characteristics: (1) It is a substantially pure cellulose having a purity of 95% or more and has heat and chemical resistances; (2) It can absorb an extremely large amount of a liquid as large as 60 to 700 times the dry weight; (3) It has an extremely wide surface area (as large as 200 times that of a wood pulp); (4) It has a strong adsorbability to fine particles; (5) It has a high moldability and an excellent shape retention; (6) It has a very high elastic modulus and a very high tensile strength (wherein the elastic modulus is of about 30 GPa, which is 4 times that of a usual organic fiber, and the tensile strength is 5 times that of a polyethylene and a polyvinyl chloride), and the like.

Figure 2:
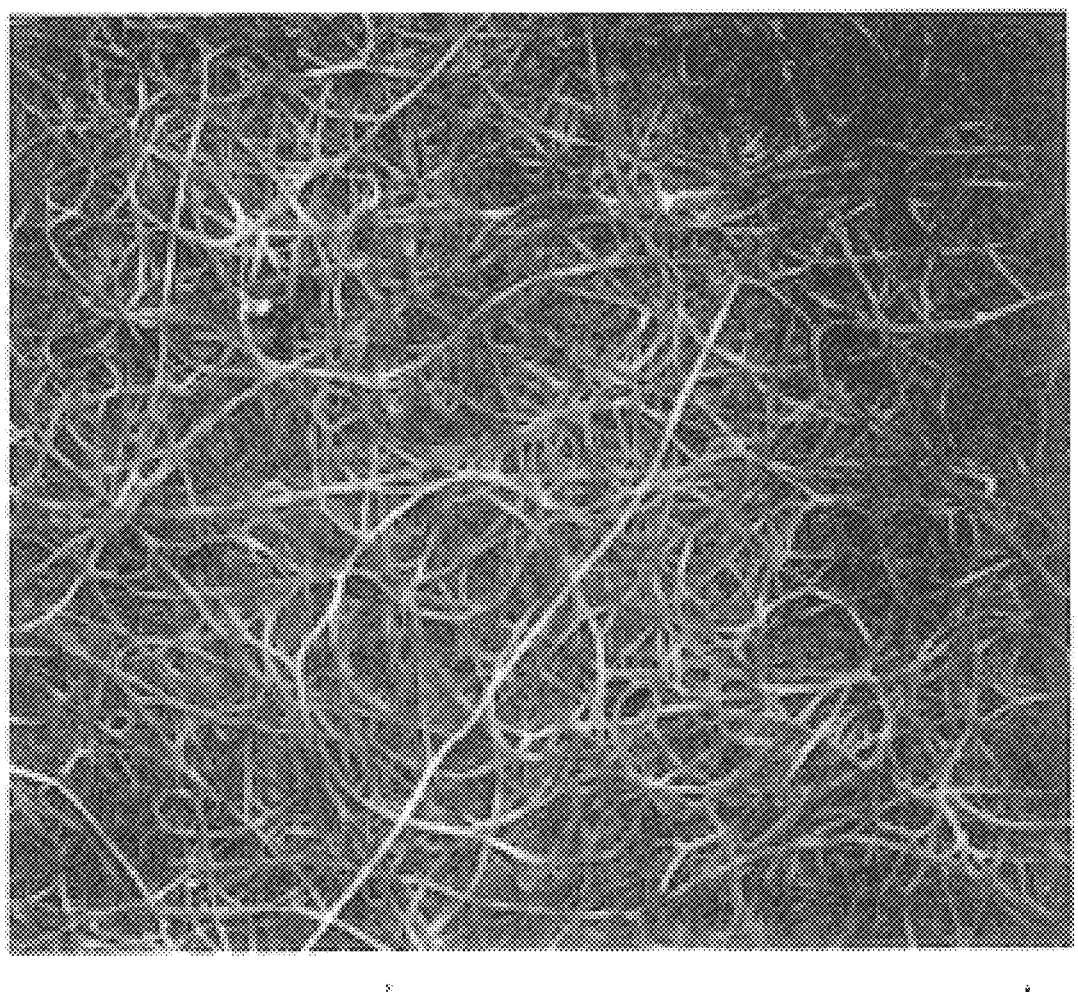
FIG. 2 is a photomicrograph showing a state in which micro-fibrils of a bacterial cellulose are interlaced to form a mesh-like structure.

As shown in FIG. 2, the separator 11 has a mesh-like structure in which micro-fibrils of the bacterial cellulose are interlaced at random. In this mesh-like structure, the diameter d of each of mesh openings is smaller than each of the charged carbon particles and therefore, is in a range of $d \leq 1$ $\mu$m, preferably, in a range of $d \leq 0.5$ $\mu$m.

The preferred thickness t of the separator 11 formed of the bacterial cellulose is in a range of $1\ \mu m \leq t \leq 100\ \mu m$, and even more preferably, in a range of $5\ \mu m \leq t \leq 20\ \mu m$. If the thickness t is smaller than 1 $\mu$m, the mechanical strength of the separator is decreased, resulting in a possibility that the separator 11 may be damaged during handling thereof. On the other hand, if t>100 $\mu$m, the distance of migration of the charged ions is increased and hence, the internal resistance of the electric double-layer capacitor 1 is increased.

The production of the bacterial cellulose is carried out according to a common bacteria-cultivating process. More specifically, at least one of the above-described bacterium strains are sown on a synthetic culture medium including a carbon substrate, a nitrogen source, an organic trace-nutrient and minerals, and left to stand or gently agitated and shaken.

Glucose, sucrose, maltose, starch hydrolyzate, molasses or the like may be used as the carbon substrate, and ethanol, acetic acid, citric acid or the like may be used alone or along with such saccharide.

The nitrogen source may be an ammonium salt such as ammonium sulfate, ammonium chloride and ammonium phosphate; an inorganic nitrogen source, such as nitrate; or an organic nitrogen source such as a protein decomposition product (e.g., a polypepton and a bactopepton) or urea.

An amino acid, vitamin, a fatty acid, nucleic acid or the like may be used as the organic trace-nutrient, and peptone, Casamino acids, yeast extract, soybean protein hydrolyzate or the like which contain them may be also used. If a nutrient-requiring variant strain requiring an amino acid for proper growth is used, the required nutrient must be added.

A phosphate, a magnesium salt, a calcium salt, an iron salt, a manganese salt or the like may be used as the mineral.

The culturing conditions may be those for the usual process, and for example, at pH of 5 to 9, at a temperature of 20 to 40° C., and for 4 to 7 days.

The bacterial cellulose produced in the above-described manner is a hydrogel in the form of a thick film (or a pellet).

In addition to the bacterial cellulose, a plant cellulose fiber such as wood pulp may be used as the cellulose fiber.

To produce the separator 11, a process is employed which involves first subjecting a cellulose fiber aggregate in a water-absorbed state or in a hydrated state (e.g. a hydrogel of a bacterial cellulose or the disintegrated product thereof or a vegetable cellulose fiber aggregate in a water-containing state) to a substituting treatment using an organic solvent to exchange the water and the organic solvent, thereby modifying the surface of the cellulose fiber. The aggregate is then dried, while at the same time, forming it into a sheet.

The organic solvents which may be used for the substituting treatment include methanol, ethanol, iso-propanol, ethyl acetate, acetone, benzene, toluene, diethyl ether, n-hexane, n-propanol, n-butanol, propylene carbonate, acetic acid, carbon tetrachloride, N-methylacetoamide, ethylene carbonate and the like. They may be used alone or in the form of a mixture.

In order to further reduce the internal resistance of the electric double-layer capacitor 1, the organic solvent should have a relative dielectric constant $\epsilon \leq 80$, that is smaller than the relative dielectric constant $\epsilon$ of water (equal to 80.10). Even more preferable is an organic solvent that has a relative dielectric constant $\epsilon \leq 10$.

The substituting treatment is carried out by immersing the cellulose fiber aggregate in the water-absorbed state or the like into the organic solvent for a predetermined time. In this case, when the hydrophobic nature of the organic solvent for the substituting treatment is strong, the cellulose fiber aggregate may be pre-treated by immersing it in an amphipathic solvent such as acetone, ethanol and the like prior to the substituting treatment. With such a pre-treatment, the substituting treatment with such organic solvents can be more readily achieved.

To improve the moldability of the separator 11, a disintegrated or homogenized product of the bacterial cellulose may be obtained by disintegrating and dispersing the hydrogel with a high-speed homogenizer.

It should be noted that even if the cellulose fiber aggregate in the dried state is subjected to the substituting treatment with the organic solvent, the surface of the cellulose fiber is not modified. However, if the dried cellulose fiber aggregate is subjected to a water absorbing treatment, the modification of the surface of the cellulose fiber by such substituting treatment can be achieved.

EXAMPLE I (I) Examples 1 to 15 of separators 11 were produced using a bacterial cellulose by a process which will be described below.

A. Production of Bacterial Cellulose (1) Preparation of Synthetic Culturing Medium As shown in Table 1, a synthetic culturing medium (pH of 6.8) was prepared using a carbon substrate, a nitrogen source, an organic trace-nutrient, a mineral and water.

TABLE 1

| Synthetic culturing medium | |
|---|---|
| Carbon substrate | 1% by weight of Sucrose |
| Nitrogen source | 0.5% by weight of Bactohepton (made by Difco, Co.) |
| Organic trace-nutrient | 0.5% by weight of yeast extract (made by Difco, Co.) |
| Mineral | 0.1% by weight of magnesium sulfate.7H$_2$O |
| Water | Balance |

(2) The synthetic culturing medium was subjected to a vapor bacterium-reducing treatment under conditions of 120° C. and 20 minutes. For example, an autoclaving process may be used to perform this vapor bacterium-reducing treatment.

(3) 40 ml of synthetic culturing medium was placed into a petri dish having a diameter of 9 cm and a depth of 2 cm. 10% by volume of an acetic acid bacterium strain (e.g. Acetobacter xylinum, IF013693 strain) grown at 30° C. for 7 days on a culturing medium similar to the above-described synthetic culturing medium was added to the synthetic culturing medium.

(4) The settled culture was carried out at 30° C. for 7 days to proliferate the acetic acid bacterium and to secrete a hydrogel of a bacterial cellulose in the form of a thick film.

(5) The hydrogel was subjected to a cleaning treatment by immersing it into a 5% solution of NaOH at room temperature for 24 hours.

(6) The hydrogel was subjected to a neutralization with acetic acid and then to a water washing treatment to provide a purified hydrogel of the bacterial cellulose.

B. Production of Separator (1) The hydrogel of the bacterial cellulose was pressed to remove excessive water, thereby fabricating a plurality of sheets, and then, the sheets were subjected to a substituting treatment with various organic solvents, whereby the surface of the bacterial cellulose was modified. The relationship between all the examples 1 to 15 of the sheets and type of the used organic solvents as well as the relative dielectric constant $\epsilon$ thereof is shown in Table 2.

TABLE 2

| | Organic solvent | |
|---|---|---|
| Example No. of sheet | Type | Relative dielectric constant $\epsilon$ |
| 1 | N-methylacetoamide | 191.30 |
| 2 | ethylene carbonate | 89.60 |
| 3 | Propylene carbonate | 69.00 |
| 4 | Methanol | 33.10 |
| 5 | Ethanol | 23.80 |
| 6 | n-propanol | 22.20 |
| 7 | Acetone | 20.70 |
| 8 | Iso-propanol | 18.30 |
| 9 | Acetic acid | 6.15 |
| 10 | Ethyl acetate | 6.02 |

TABLE 2-continued

| Example No. of sheet | Organic solvent Type | Relative dielectric constant $\epsilon$ |
|---|---|---|
| 11 | Diethyl ether | 4.20 |
| 12 | Benzene | 2.28 |
| 13 | Toluene | 2.24 |
| 14 | Carbon tetrachloride | 2.24 |
| 15 | n-Hexane | 1.89 |

The substituting treatment was carried out under conditions where the sheet was immersed in the organic solvent at room temperature for about 30 minutes. In this case, the organic solvents for the examples 3 and 10 to 15 have a strong hydrophobic nature and hence, a pretreatment which involves immersing each of the sheets in acetone at room temperature for 30 minutes was carried out prior to the substituting treatment with the organic solvent.

(2) Each of the sheets was subjected to drying treatment under conditions of a reduced pressure, 75° C. and one hour.

(3) Each of the sheets was then cut to size to provide examples 1 to 15 of separators 11 that were 4 cm long and 4 cm wide in size. The thickness t of each separator 11 was in a range of 10 $\mu m \leq t \leq 15$ $\mu m$. This applies to each of separators 11 that will be described hereinafter.

FIG. 2 is a photomicrograph showing a state in which micro-fibrils of the bacterial cellulose are interlaced with one another to form a mesh-like structure. In this case, the average diameter of the micro-fibrils is equal to or smaller than 50 nm, and the diameter of the thinnest micro-fibril was about 10 nm.

II. Construction of Electric Double-layer Capacitor

In an electric double-layer capacitor 1 shown in FIG.1, each of the examples 1 to 15 was used as the separator 11 thereof. Each of the electrodes 12 and 13 is a porous member having a diameter of 20 mm and a thickness of 0.4 mm, and comprised of 73.3% by weight of activated carbon (made by Kansai Coke and Chemicals Ltd., under a trade name of 20SPD), 13% by weight of a binder (made by Mitsui-DuPont Fluorochemicals Inc., under a trade name of Teflon 6J), and 13.7% by weight of a conductive filler (carbon black). To produce the electrodes 12 and 13, steps of kneading a mixture for one hour by a two-screw kneading machine, rolling the mixture and molding the mixture were sequentially used.

The physical drying of the electrodes 12 and 13 and the separator 11 was then carried out in vacuum under conditions of 110° C. for 4 hours after placing them into the body 3 of the casing 2. Such simultaneous drying of the electrodes 12 and 13 and the separator 11 was feasible, because the separator 11 has a heat resistance.

One mole/liter of a solution of $(C_2H_5)_4$ $NBF_4PC$ (tetraethylammonium-tetra-fluoro-borate propylene carbonate) which is an organic solvent was used as the electrolytic liquid 16. The electrolytic liquid 16 was injected into the body 3 within a high-purity Ar gas-circulated globe box and then, the lid plate 4 was attached to the body 3 to tightly close the opening thereof.

III. For comparison, examples 16 to 18 of separators that will be described below were produced and used to form electric double-layer capacitors 1 similar to those described above.

EXAMPLE 16

The hydrogel of a bacterial cellulose of the type described in the item A was pressed to remove water, thereby forming a sheet. The sheet was subjected to a drying treatment under a reduced pressure at 75° C. for 1 hour and to a subsequent cutting to provide a separator 11 which was 4 cm long and 4 cm wide in size. In this case, the solvent used was water and had a relative dielectric constant $\epsilon$ equal to 80.10.

EXAMPLE 17

A non-woven fabric of a polypropylene fiber (made by Nippon Kodoshi Corporation, under a trade name of MPF2580) resulting from a hydrophilic rendering treatment was cut to provide a separator 11 of 4 cm long and 4 cm wide in size.

EXAMPLE 18

A stretched film of polytetrafluoro-ethylene (made by Millipore Corporation, under a trade name of JMWP) resulting from a hydrophilic rendering treatment was cut to provide a separator 11 which was 4 cm long and 4 cm wide in size.

IV. Charging/Discharging Test

Each of the electric double-layer capacitors 1 described above was then charged and discharged repeatedly under conditions of a charging voltage of 2.3 V or 3.5 V, a discharging voltage of 0 V, and a charging and discharging current of 5 mA. The internal resistance of each of the electric double-layer capacitors 1 was calculated based on a decrement in voltage provided upon switch-over from the charging to the discharging in a curve of charging/discharging of the capacitor 1. Table 3 shows test results.

TABLE 3

| Separator | | Internal resistance ($\Omega$) of Electric double-layer capacitor | |
|---|---|---|---|
| | | Charging voltage 2.3 V | Charging voltage 3.5 V |
| Example | 1 | 14.3 | 124.1 |
| | 2 | 14.3 | 71.8 |
| | 3 | 6.1 | 49.0 |
| | 4 | 6.1 | 45.7 |
| | 5 | 6.1 | 49.0 |
| | 6 | 6.1 | 52.2 |
| | 7 | 6.1 | 42.5 |
| | 8 | 6.1 | 39.2 |
| | 9 | 4.1 | 58.8 |
| | 10 | 6.1 | 42.5 |
| | 11 | 4.1 | 39.2 |
| | 12 | 4.1 | 32.7 |
| | 13 | 6.1 | 42.5 |
| | 14 | 8.2 | 52.2 |
| | 15 | 2.0 | 42.5 |
| Example | 16 | 114.3 | 303.7 |
| | 17 | 12.2 | 58.8 |
| | 18 | 6.1 | 52.2 |

As apparent from Table 3, if the separators 11 of the examples 1 to 15 are used, the internal resistance of the capacitor is remarkably lowered, as compared with the case where the separator of the example 16 which was not subjected to the organic solvent treatment is used.

If the examples 3 to 15 are compared with the examples 1 and 2, it is expedient to use the organic solvent having a relative dielectric constant $\epsilon \leq 80$.

The examples 17 and 18 also have an effect of lowering the internal resistance. However, the example 17 is accompanied by a disadvantage that the heat and chemical resistances thereof are relatively low, and the example 18 is accompanied by a disadvantage that it is extremely expensive.

EXAMPLE II

Examples 1 to 3 of separators that will be described below were produced and used to form electric double-layer capacitors 1 similar to those described above.

EXAMPLE 1

A hydrogel of a bacterial cellulose of the type described in the item A in EXAMPLE I was subjected to a disintegrating treatment by a high-pressure homogenizer and then, the concentration of the cellulose was regulated to 0.2% (by dry weight). Thereafter, the resulting bacterial cellulose was subjected to a paper making to provide a sheet. The sheet was subjected sequentially to a substituting treatment with acetone, to a drying treatment under a reduced pressure at 75° C. for one hour and to a cutting treatment to provide a separator 11 which was 4 cm long and 4 cm wide in size.

EXAMPLE 2

Using a micro-fibrilated product of wood pulp (made by Daicel Chemical Industries Ltd., under a trade name of Cellish), a paper making was carried out to produce a sheet. The sheet was subjected sequentially to a substituting treatment with acetone, to a drying treatment under a reduced pressure, at 75° C. and for one hour, and to a cutting treatment to provide a separator 11 which was 4 cm long and 4 cm wide in size.

EXAMPLE 3

A sheet (made by Nippon High-grade Paper Industries Co., under a trade name of PEDH) formed of Manila hemp was subjected to a water absorbing treatment for 10 minutes, to a substituting treatment with acetone, to a drying treatment under a reduced pressure at 75° C. for one hour, and to a cutting treatment to provide a separator 11 which was 4 cm long and 4 cm wide in size.

For comparison, examples 4 to 6 of separators 11 that will be described below were produced and used to form electric double-layer capacitors 1 similar to those described above.

EXAMPLE 4

The sheet of the example 1 resulting from the paper making process was subjected sequentially to a drying treatment under a reduced pressure at 75° C. for one hour and to a cutting treatment to provide a separator 11 which was 4 cm long and 4 cm wide in size.

EXAMPLE 5

The sheet of the example 2 resulting from the paper making process was subjected sequentially to a drying treatment under a reduced pressure at 75° C. for one hour and to a cutting treatment to provide a separator 11 which was 4 cm long and 4 cm wide in size.

EXAMPLE 6

The sheet of the example 3 was subjected to a cutting treatment to provide a separator 11 which was 4 cm long and 4 mm wide in size.

Therefore, the separators 11 according to the examples 4 to 6 were produced without the substituting treatment with the organic solvent.

Using the electric double-layer capacitors 1, a charging/discharging test was carried out in a manner similar to that described in the item IV in EXAMPLE I.

Table 4 shows test results.

TABLE 4

| separator | | Internal resistance ($\Omega$) of electric double-layer of capacitor | |
|---|---|---|---|
| | | Charging voltage 2.3 V | Charging voltage 3.5 V |
| Example | 1 | 6.1 | 49.0 |
| | 2 | 6.1 | 45.7 |
| | 3 | 18.4 | 107.8 |
| Example | 4 | 34.7 | 365.7 |
| | 5 | both electrodes were non-conducting therebetween | both electrodes were non-conducting therebetween |
| | 6 | | |

It can be seen from Table 4 that the substituting treatment with the organic solvent is effective for o,proving the permeability of the electrolytic liquid 16 to the cellulose-based separators 11 to lower the internal resistance of the electric double-layer capacitors 1. In the case where the example 4 was used, the internal resistance of the electric double-layer capacitor 1 was higher because of decreased permeation, and in the case where the examples 5 and 6 were used, both the electrodes 12 and 13 were non-conducting therebetween because of the extremely poor permeation.

EXAMPLE III

Examples 1 to 6 of separators 11 that will be described below were produced and used to form electric double-layer capacitors 1 similar to those described above.

EXAMPLES 1 to 6

A sheet was made by pressing a hydrogel of a bacterial cellulose of the type described in the item A in EXAMPLE I to remove water. Then, the sheet was subjected to a drying treatment under a reduced pressure at 75° C. for one hour. The dried sheet was subjected sequentially to a water absorbing treatment for 10 minutes, to a substituting treatment with acetone having various concentrations, to a drying treatment under a reduced pressure at 75° C. for one hour and to a cutting treatment, thereby providing separators 11 which were 4 cm long and 4 cm wide in size.

For comparison, examples 7 and 8 of separators 11 which will be described below were produced and used to form electric double-layer capacitors 1 similar to those described above.

EXAMPLE 7

A dried sheet of Example 1 was subjected sequentially to a substituting treatment with acetone, to a drying treatment under a reduced pressure at 75° C. for one hour and to a cutting treatment to provide a separator 11 which was 4 cm long and 4 cm wide in size.

EXAMPLE 8

A dried sheet was subjected to a cutting treatment to provide a separator 11 which was 4 cm long and 4 cm wide in size. In this case, the solvent was water.

Using the electric double-layer capacitors, a charging/discharging test was carried out in a manner similar to that described in the item IV in EXAMPLE I, except that the charging voltage was set at 2.3 V.

Table 5 shows the concentration of the acetone and the results of the charging/discharging test for the examples 1 to 6 and the example 7 of the separators 11.

TABLE 5

| Separator | | Concentration (%) of acetone | Internal resistance (Ω) of electric double-layer capacitor |
| --- | --- | --- | --- |
| Example | 1 | 20 | 100.0 |
|  | 2 | 60 | 49.0 |
|  | 3 | 90 | 36.7 |
|  | 4 | 95 | 16.3 |
|  | 5 | 99 | 10.2 |
|  | 6 | 100 | 6.1 |
| Example | 7 | 100 | 216.3 |
|  | 8 | — | 102.0 |

In table 5, if the dried sheet is subjected to the water absorbing treatment as in the examples 1 to 6, a modification effect can be achieved by the subsequent organic solvent treatment. In this case, it can be mentioned that in order to provide a decrease in internal resistance of the electric double-layer capacitor, acetone, the organic solvent should contain no water. If the water absorbing treatment is not carried out prior to the organic solvent treatment, as in the example 7, the modification effect by the organic solvent treatment cannot be achieved and hence, the internal resistance of the electric double-layer capacitor 1 is higher than that of the example 8 made by the dried sheet.

With the inventive separator, the wettability of the cellulose fiber to the electrolytic liquid is improved and hence, the permeability of the electrolytic liquid into the separator is improved. Thus, it is possible to lower the internal resistance of the electric double-layer capacitor.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An electric double-layer capacitor, comprising:
   a pair of porous electrodes;
   a permeable separator sandwiched between said pair of porous electrodes,
   said separator formed from an aggregate of cellulose fiber having a surface modified by an organic solvent; and
   an electrolytic organic solvent permeating said porous electrodes and said separator.

2. The electric double-layer capacitor according to claim 1, wherein said cellulose fiber is a bacterial cellulose which is produced by at least one of bacterium strains each belonging to a genus related to the group consisting of Acetobacter, Rhizobium, Agrobacterium, Pseudomonas, Alcaligenes, Sarcina, Achromobacter, Aerobacter, and Azotobacter and variant strains induced from the bacterium strains.

3. The electric double-layer capacitor according to claim 2, wherein said cellulose fiber is a hydrogel bacterial cellulose fiber.

4. The electric double-layer capacitor according to claim 2, wherein said cellulose fiber is a homogenized bacterial cellulose fiber.

5. The electric double-layer capacitor according to claim 2, wherein said separator has a thickness in a range of 1 μm to 100 μm.

6. The electric double-layer capacitor according to claim 1, wherein said cellulose fiber is a plant fiber.

7. The electric double-layer capacitor according to claim 1, wherein said organic solvent is a liquid organic solvent.

8. The electric double-layer capacitor according to claim 1, wherein said organic solvent is selected from the group consisting of methanol, ethanol, iso-propanol, ethyl acetate, acetone, benzene, toluene, diethyl ether, n-hexane, n-propanol, n-butanol, propylene carbonate, acetic acid and carbon tetrachloride.

9. The electric double-layer capacitor according to claim 1, further comprising:
   a casing for encapsulating said pair of electrodes, said separator, and said organic solvent;
   a lid for closing an opening in said casing, and
   an electrically insulating seal disposed between said casing and said lid.

10. The electric double-layer capacitor according to claim 9, wherein said lid is connected to an anode of a power source and said casing is connected to a cathode of the power source or to a ground.

11. The electric double-layer capacitor according to claim 9, further comprising:
   a current collector superposed on one of said electrodes, and
   a conductive spring member provided between said current collector and said lid for maintaining a lamination between said electrodes and said separator.

12. The electric double-layer capacitor according to claim 9, further comprising:
   a plurality of bores provided in said casing and said lid,
   a plurality of screws penetrating said plurality of bores for attaching said lid to said casing, and
   an electrically insulating material provided on an inner peripheral surface and an open peripheral edge of said bores to electrically insulate said screws from said bores.

13. The electric double-layer capacitor according to claim 1, wherein said organic solvent has a relative dielectric constant $\epsilon$ less than or equal to 80.

* * * * *